Patented Sept. 9, 1952

2,610,162

UNITED STATES PATENT OFFICE 2,610,162

ADHESIVE CEMENT SOLUTION CONTAINING A SULFUR-CURED RUBBER

Harry J. Hoffman, Detroit, Mich., assignor to Minnesota Mining & Manufacturing Company, St. Paul, Minn., a corporation of Delaware No Drawing. Application February 20, 1948, Serial No. 9,949

7 Claims. (Cl. 260—27)

This is a continuation-in-part of my prior copending application Serial No. 567,323, filed December 8, 1944, now abandoned.

This invention relates to adhesive cement compositions having a rubbery base. More particularly it concerns adhesive cement compositions having improved properties as a result of having the rubber content of the cement sulfur-cured as hereinafter described more in detail.

Heretofore rubber cements have been made of ordinary natural rubber (in unvulcanized form), i. e. crude rubber, and of such depolymerized rubber as ordinary reclaimed rubber. Natural rubber has been used for decades in the making of adhesives for surgeon's tape and electrical tape, as shoe cements, and such like. Reclaimed rubber cements are illustrated by the disclosures of the Zimmerli et al. Patents Nos. 1,937,861 and 1,892,123. It has also been suggested heretofore to make adhesive cements of one type or another from various synthetic rubbers.

The utility of such prior cements was limited in respect to a number of uses by (among other things) the amount of plastic flow of the final dried film of such cements. This limitation of utility has been more pronounced in respect to cements made with certain rubbers than it has been with others. For example, it has been more pronounced in the case of such a synthetic rubber as Buna-S synthetic rubber than in the case of reclaimed rubber, such as used by Zimmerli et al. The reclaimed rubber adhesive cements, as heretofore made, have still other limitations on their utility, however.

My invention involves accomplishing, by the method hereinafter described, what has heretofore never been done, insofar as I am aware. That is, I secure improved results by producing an adhesive cement in which the rubber component has been sulfur-cured as hereinafter described.

It has heretofore been understood, and correctly so, that ordinary vulcanized rubbers, such as ordinary inner tubes or tires of commerce, will not dissolve in gasoline. They may swell somewhat when exposed to gasoline for a long period of time, but they will not either dissolve or disperse in a hydrocarbon liquid such as ordinary gasoline. Ordinary crude natural rubber, on the other hand, is readily soluble in aliphatic hydrocarbon solvents such as ordinary gasoline.

Reclaimed rubber, for use in making adhesive cements, is likewise readily dispersible in ordinary aliphatic hydrocarbons such as ordinary gasoline, as illustrated by the aforesaid Zimmerli et al. patents. Reclaimed rubber, prepared by high temperature digestion, refining and plasticizing of vulcanized rubber, is actually depolymerized rubber and is not the same as either crude rubber or sulfur-cured rubber, as is well understood by those skilled in the art and as can be demonstrated by analytical methods such as infra-red spectroscopy. Such depolymerized rubber is more closely equivalent to crude rubber than to sulfur-cured rubber, as evidenced by its action on the rubber mill as well as its ready dispersibility in gasoline and other aliphatic hydrocarbons.

But vulcanized inner tubes, rubber footwear and other manufactured rubber articles of the type best known to everyone (which excludes ordinary unvulcanized natural rubber such as latex crepe or smoked sheets) are not soluble or dispersible in such solvents. Neither are they soluble or dispersible in any kind of hydrocarbon solvents, either aromatic or aliphatic.

I have found, however, that I can make solvent-type adhesive cements in which the rubber component has been sulfur-cured, by following the procedure of blending the rubber component in raw or depolymerized state with a suitable tackifying resin, and blending therewith a suitable agent to effect a sulfur-cure, in an amount in excess of that normally required for sulfur-curing of said rubbery polymer to insolubility in gasoline, following which I sulfur-cure the rubber component in admixture with the resin. I find that the resulting reacted composite can be readily dispersed in an aliphatic hydrocarbon, such as ordinary gasoline, as above mentioned. I particularly contemplate such an extent of sulfur cure (as indicated by the amount of sulfur curing agent employed and the time and temperature of the sulfur curing reaction) that, in the absence of effecting the sulfur-cure in the presence of the resin component as herein defined, such cure would make the rubber component non-dispersible in an aliphatic hydrocarbon such as ordinary gasoline.

By "non-dispersible" I mean that such a sulfur cured product, produced in the absence of the resin, would be mainly undissolved by such a solvent, even though, if ground up, it might contain a minor percentage of material which might be extracted by such a solvent, leaving the remainder undissolved and undispersed, i. e., in the form of swollen lumps or particles, unsuitable for application by brushing or spraying.

To specifically illustrate one embodiment of my invention which well demonstrates some of its important advantages, I will now describe in detail one of my adhesive cement compositions and my preferred method of producing the same.

Formula 1

| | Pounds |
|---|---|
| Rubbery butadine - styrene copolymer (Buna-S) | 500 |
| Dipentamethylene thiuram tetrasulfide | 7.5 |
| Zinc oxide | 10 |
| Petroleum base diolefin resin ("Velsicol AB-11-4") | 350 |
| Petroleum base aromatic resin ("Dutrex 20") | 70 |
| Terpene resin ("Piccolyte S-25") | 35.5 |
| Zinc resinate (4.8% combined zinc) | 300 |
| Ethyl alcohol | 35 |
| Volatile hydrocarbon solvent (petrobenzol, a petroleum solvent having a boiling-point range of 140–210° F. and weighing 5.83 lbs. per gallon) | 2460 |

A suitable rubbery butadiene-styrene copolymer is a copolymer of 72 parts by weight of butadiene and 28 parts by weight of styrene, copolymerized by the emulsion process with the use of a fatty acid soap. (In commerce such polymer is known as GRS-50.)

The diolefin resin has a melting point, by the ball and ring method, of 230–245° F., and a specific gravity at 60° F. of 1.090–1.120. It is a resinous material of hydrocarbon origin, and usually of a reddish brown color and a translucent nature, produced by the polymerization of olefins obtained in the cracking of petroleum.

The aromatic resin has a specific gravity of 1.00, a boiling range at 1 mm. of 360–537° F., and a viscosity at 100° F. of 938 centistokes. It is a highly aromatic hydrocarbon product derived from petroleum. At ordinary room temperatures it is a soft, semi-fluid, plastic material, usually of a light brown color and translucent nature.

The pure hydrocarbon thermoplastic terpene resin employed in Formula 1 has a zero acid number and a melting point of 25° C.

The Buna S polymer is first warmed up on a rubber mill, and the dipentamethylene thiuram tetrasulfide (which is the sulfur-curing agent in the formula), the zinc oxide pigment, and 200 lbs. of the diolefin resin are separately added and uniformly milled into the polymer. The milled base is then removed from the mill in sheets, and placed in an autoclave where it is heated for 3 hours under 30 lbs./sq. in. gauge, steam pressure (274° F.) for curing.

The cured stock is then returned to the mill, where it is worked for about 5 minutes, after which the remaining 150 lbs. of diolefin resin is added and the batch milled until uniform. It is then removed to a steam-jacketed heavy duty internal mixer, such as a Baker-Perkins mixer, heated by steam at 40 lbs./sq. in. in the jacket. The aromatic resin and the terpene resin are then carefully added. The well-mixed batch is then cooled, by running cooling water through the jacket of the mixer, and 200 gallons of the petrobenzol is slowly added to produce a thick, heavy plastic mass. The batch is usually cooled to about 200° F. before the petrobenzol is added.

The zinc resinate, a light-colored reaction product of zinc oxide and wood rosin, is separately dissolved in 300 lbs. of the petrobenzol and the 35 lbs. of ethyl alcohol. This solution is then added to the plastic mass in the internal mixer, and the balance of the petrobenzol is then added to provide the desired viscosity.

The resulting product is ready for use as an adhesive cement. One of its illustrative uses is in the bonding of trim cloth to asphalt-impregnated fiber-board in the fabrication of automobile upholstery and trim. In this operation, the areas of both cloth and board adjacent the edges are coated with the adhesive by application from a spray gun. The cloth is stretched tightly across the face of the board, and the coated edges of the cloth bonded to the coated edges of the rear surface of the board by pressing the partially dried adhesive-coated surfaces together. Immediately the assembly may be exposed to temperatures of 160° to 180° F. without disrupting the bond or loosening the cloth, as by passage of the cloth-trimmed panels through a drying oven. If instead of using the adhesive cement of Formula 1, a Buna S synthetic rubber cement not having my sulfur cure were employed in the use just mentioned, the trim cloth, with its inherent tendency to spring away from the fiber-board, would spring away from the same during passage of the panel through the oven and the bond would be disrupted.

The cement of Formula 1 has many other uses, but the foregoing is illustrative of some of its advantageous properties. In addition, the dried film has high internal strength, both at ordinary room temperatures, as well as at higher and lower temperatures.

In making up the cement of Formula 1, the dipentamethylene thiuram tetrasulfide is the sulfur-curing agent and serves to cure the Buna S rubber so that the adhesive cement composition, when applied as a coating or film in usage, has high resistance to plastic flow even before all of the solvent has evaporated.

If the amount of Buna S rubber shown in Formula 1 were heated for the time and temperature mentioned above, namely, 3 hours at a temperature of 274° F., with the sulfur-curing agent named, but in the absence of the resin as provided for, the resulting sulfur cured product would not be soluble or dispersible in a volatile hydrocarbon solvent such as the petrobenzol mentioned. If an attempt were made to dissolve or disperse Buna S synthetic rubber cured with a sulfur curing agent as illustrated (the curing being effected in the absence of admixed resin or tackifier), in a solvent such as petrobenzol, even if such a sulfur cured product were cut up into rather small pieces, it would be found that such pieces of such sulfur cured rubber would remain largely undissolved even after a long period of time, and even following much mixing, thus making it impossible to use such material in the practical production of adhesive cements.

Another example of a composition involving the same principle as that of Formula 1, but where the composition has a higher viscosity, desirable in certain uses, is as follows:

Formula 2

| | Pounds |
|---|---|
| Copolymer (as in Formula 1) | 500 |
| Dipentamethylene thiuram tetrasulfide | 7.5 |
| Zinc oxide | 710 |
| Olefin resin (as in Formula 1) | 350 |
| Zinc resinate (as in Formula 1) | 300 |
| Aromatic resin (as in Formula 1) | 75 |
| Mineral spirits | 1350 |

A sulfur-cured mill base is prepared from the polymer, sulfur-curing agent, 10 lbs. of the zinc oxide, and 200 lbs. of the olefin resin, and to this cured mill base is added the balance of the olefin resin by milling, all as described in Formula 1. The zinc resinate, dissolved in an equal weight of the solvent, is added to the milled composition in an internal mixer. The additional 700 lbs. of zinc oxide is next mixed into the plastic mass in the mixer, followed by the aromatic resin and finally by the balance of the mineral spirits, producing a heavy, plastic adhesive cement product which is suitable for use as an adhesive cement in attaching ceramic tiles to wall surfaces.

*Formula 3*

| | Parts by weight |
|---|---|
| Smoked sheet rubber | 100 |
| Antioxidant ("Santovar A," an alkylated polyhydroxy phenol) | 1 |
| Sulfur | 1 |
| Accelerator (mercaptobenzothiazole) | 1 |
| Zinc oxide | 2 |
| Diolefin resin (as in Formula 1) | 20 |
| Limed rosin (wood rosin treated with 7% hydrated lime) | 100 |
| Petrobenzol | 400 |

The rubber, antioxidant, sulfur and accelerator, zinc oxide, and diolefin resin are milled together on the rubber mill. The mill batch, in sheet form, is then heated for 3 hours at 30 lbs. steam pressure to provide sulfur-curing of the rubber. The cured base is re-milled, and 30 parts of the limed rosin is added and milled in until the batch is smooth. It is removed in sheet form, cut into small squares, and, together with the remaining 70 parts of limed rosin, is dissolved (dispersed) in the petrobenzol solvent by means of a paddle type mixer.

In the rubber goods industry rubber is ordinarily cured with 1% of sulfur and suitable accelerators to provide solvent-resistant rubber goods such as insulation, hospital sheeting, rubber mountings and the like, which are insoluble and cannot be dispersed in solvents such as petrobenzol. However, the above formula (which employs 1% of sulfur), due to the practice of the present invention, provides an adhesive cement composition in which the sulfur-cured rubber is effectively dissolved or dispersed in petrobenzol. The product is sprayable without cobwebbing and blotching; dried coatings thereof are smooth, and are highly resistant to plastic flow, and also have high internal strengths.

*Formula 4*

| | Pounds |
|---|---|
| Rubbery copolymer of 65 parts butadiene, 35 parts acrylonitrile (a Buna N rubber) | 100 |
| Zinc oxide | 5 |
| Antioxidant ("Santovar A") | 1 |
| Pentamethylene thiuram tetrasulfide | 1.5 |
| Tributyl phosphate (plasticizer for Buna N) | 20 |
| Glycerine ester of gasoline-insoluble fraction of pine wood extract ("Vinsol Ester Gum") | 75 |
| Dixie clay | 7.5 |
| Resinous heat-reactive oil-soluble product of para-tertiary-butyl phenol and formaldehyde ("Beckacite 1003") | 30 |
| Aromatic resin (as in Formula 1) | 20 |
| Terpene resin (as in Formula 1) | 15 |
| Methyl isobutyl ketone (volatile solvent) | 600 |

The procedure employed in preparing a sprayable adhesive cement composition having the above formula is similar to that described in connection with Formula 1. The polymer, zinc oxide, accelerator, sulfur-curing agent, plasticizer, and 30 lbs. of the resinous ester are first milled together, then cured by heating for 3 hours at about 274° F. (30 lbs./sq. in. steam). A further 15 lbs. of the ester is milled into the cured batch, and the clay is also milled in. The batch is then transferred to the internal mixer, where the balance of the resinous ester, the other resinous components, and finally the solvent are added and well mixed in. The mixer is heated with jacket steam at 80 lbs. per sq. in. pressure during the addition of the resins, the temperature of the rubbery mass remaining much lower than that of the jacket steam. The mass then is cooled before the solvent is added.

Buna N type polymers are not soluble in gasoline but are readily soluble in volatile organic solvents such as methyl ethyl ketone, methyl isobutyl ketone, etc. to produce viscous solutions which cobweb badly when atomized with air. When heated with sulfur-curing agents in the conventional way, Buna N is rendered insoluble and non-dispersible in such solvents. However, sulfur-curing the polymer in accordance with the present invention, e. g. by the above-described procedure, provides a smooth, stable, sprayable adhesive cement composition which also has greatly improved resistance to plastic flow in the form of a dried film and much increased internal strength.

*Formula 5*

Another specific composition embodying the principles of the present invention is a sprayable heat-insulation composition. Sprayability provides for the application of the material in desirably thick and close-fitting coatings to curved and otherwise inaccessible structural members, such as automotive floors and dashboards, aircraft heater ducts, etc., where pre-formed batts or sheets of cellular insulating material are difficult or impossible to apply.

| | Pounds |
|---|---|
| Red inner tube reclaimed rubber | 400 |
| Zinc oxide | 20 |
| Dipentamethylene thiuram tetrasulfide | 8 |
| Antioxidant ("Age Rite Resin D") | 4 |
| Limed rosin (as in Formula 3) | 400 |
| Water | 20 |
| Expanded vermiculite (about 24-mesh particle size) | 1500 |
| Volatile petroleum solvent (boiling range 140–210° F., 5.83 lbs. per gallon) | 5300 |

The reclaimed rubber, which contains about 62% of rubber hydrocarbon, is softened by milling on a rubber mill, and the zinc oxide is milled in. The mixture is then transferred to a heavy duty internal mixer (of the Baker-Perkins type) and half of the limed rosin is added in small portions and mixed into the batch. The dipentamethylene thiuram tetrasulfide is then added and mixed in, after which the mixer is heated (as by 40 lb./sq. in. jacket steam) to obtain a temperature of 250° F. in the rubbery mass, which temperature is maintained for 1½ hours. During this time the rubber is sulfur-cured and the mixture becomes dry and crumbly. The remainder of the limed rosin, together with the antioxidant, is then added, and mixing continued until the mass knits together and becomes smooth and homogeneous.

The mixture is now cooled to about 200° F., by passing cooling water through the jacket of the mixer. About 10% of the solvent is added slowly, so as to guard against "breaking" of the mass;

the water is then added and mixed in well, followed by the remainder of the solvent in small increments.

The expanded vermiculite insulating material is next added to the solvent-dispersed mass and mixed in uniformly, to produce a final composition which may be applied to various surfaces by means of a suitable spray-gun, and when thus applied to vertical surfaces will not run or sag to an undesirable degree under its own weight after application and during drying. The dried coating remains strongly adhered to the surface to which applied, is low in apparent density and therefore high in heat insulation value, and does not break or crumble even under severe vibration. Furthermore, it does not soften and sag or flow, or compact together, even at quite high temperatures, and when thoroughly dried is resistant to the softening and weakening action of various oils and solvents.

Attempts have been made to use compositions containing reclaimed (depolymerized) vulcanized rubber, e. g. Zimmerli type cements, together with expanded vermiculite and additional solvent in providing stable, sprayable insulating compositions of the type represented by Formula 5. However, such compositions settle out badly on standing in containers and on being forced through the hoses of spray systems. The dried film is soft and plastic. It is quite thermoplastic, as compared to the type of coatings produced with sulfur-cured reclaim as here disclosed, such as that illustrated by Formula 5.

The spray-coated and dried product of the above example in approximately 1-inch thickness, either adherently bonded to a supporting surface or as a self-sustaining flat block, has shown an apparent density of only 19 lbs. per cubic foot, and a thermal conductivity rating ("K value") of 0.598 (B. t. u. per square foot per degree F. per inch thickness). The self-sustaining thermal insulation member was formed by spraying the plastic composition on a horizontal sheet of "cellophane," drying the mass, and subsequently moistening the exposed surface of the "cellophane" to form a repellent surface next the dried mass, thus permitting easy removal of the "cellophane." Other repellent surfaces such as amalgamated tin may similarly be used; the dried mass does not remain adherently bonded to, but may readily be lifted away from, such surfaces.

Rubber which has been sulfur-cured with 1% of sulfur, or about 1.5% of dipentamethylene thiuram tetrasulfide without added sulfur, is so insoluble as to serve in making many manufactured rubber products (such as hospital sheeting, etc. mentioned elsewhere herein) and cannot be dispersed in gasoline solvents, as is required in making gasoline solvent type adhesive cements. It is therefore quite surprising that my cured reclaimed rubber, which initially contains some small percentage of sulfur, and which additionally has been heated at curing temperature with well over 3% of dipentamethylene thiuram tetrasulfide based on the rubber content, is nevertheless dispersible in gasoline. While I do not wish to be limited thereby, I believe that the explanation of this phenomenon may be the presence of the large but controlled amount of soluble and compatible resin which I add to the rubber portion of my composition prior to heating thereof. The amount of resin present in the batch during sulfur curing should, for best results, be controlled within limits, since too little resin retards or reduces the solubility of the cured rubber, while too large a quantity of the resinous constituent decreases the toughness of the final dried residue and also requires much additional heating time in the mixer for the batch to reach the "crumbly" stage. Thus I have found it desirable to add not less than 25% (100 parts) and not more than 75% (300 parts) of the limed rosin to the reclaim rubber mill batch in the above specific formula prior to heating at 250° F. Since the reclaimed rubber contains only about 62% (i. e. about 250 parts by weight) of rubber hydrocarbon, the preferred limiting percentages of limed rosin based on the rubber hydrocarbon are therefore about from 40% to 120%. Substitution of other rubbery polymers and/or other soluble, compatible resins may of course permit some variation from these values while still retaining the valuable properties described. Thus in Example 3, the resin content prior to sulfur-curing is seen to be 20% of the rubber content. Useful results have also been obtained with as low as 15% of resin based on the rubber content.

The total amount of limed rosin in the final composition of the specific example hereinbefore given, for example, may also be varied within quite wide limits, increased amounts producing somewhat higher adhesion values but also contributing to increased brittleness, especially at low temperatures. In general, I may use from about 30 to about 300 parts of limed rosin for each 100 parts of reclaimed rubber to produce useful compositions, although I generally prefer to use approximately equal parts, as shown in the example.

Where the heat-insulating properties of Formula 5 are not desired, but its adhesive characteristics are wanted, the vulcanized reclaimed rubber composition of Formula 5 may be used in the absence of the vermiculite or equivalent. For such usages, it is desirable to increase the other solids in relation to the solvent content, as by reducing the amount of solvent in the formula so as to compensate for the omission of the vermiculite. The viscosity may, for example, be controlled to a value equivalent to the viscosity of the adhesive cement composition of Formula 1, or of that general order. The composition thus obtained has superior spraying qualities as compared to a reclaimed rubber cement of the Zimmerli et al. type, and additionally both with some residual solvent and in the form of the fully dried film, respectively, is more resistant to plastic flow and is also of increased internal strength, both at room temperature, as well as at higher and lower temperatures.

Hereinabove we have shown adhesive cement compositions embodying the principles of this invention, made with several different rubbery polymers, and having advantages in connection with all of them. Rubbery polymers differing somewhat from those illustrated, for example such as butyl rubber, may also advantageously be treated in accordance with my invention in making adhesive cements. In general, the principles of this invention are applicable in the making of adhesive cements from rubbery polymers which are soluble in volatile organic solvents (e. g. as above illustrated) and which can be sulfur-cured to make them insoluble and non-dispersible in such solvents (where the teaching of this invention is not followed). It will be noted that natural crude rubber, Buna S, Buna N, butyl rubber, and reclaimed (depolymerized) rubber all fall into the category of polymers of a conjugate-diolefin hydrocarbon (either alone or with one or more additional polymerizable monomers). Crude rubber is classifiable as a polymer of a conjugate-diolefin hydrocarbon alone, i. e. it is a polymer of isoprene, and reclaimed rubber is a depolymerized form of vulcanized crude rubber. Buna S and Buna N are each copolymers of a major proportion of a conjugate-diolefin hydrocarbon, viz. butadiene, with another unsaturated monomer: which is styrene or the like in the case of Buna S types of rubber and acrylonitrile or the like in the case of Buna N types of rubber. Examples of unsaturated monomers in addition to styrene and acrylonitrile, are isobutylene, methacrylonitrile, methyl styrene, 2-vinyl pyridine, and the like. Butyl rubber is an example of a copolymer of a minor proportion of a conjugate diolefin hydrocarbon, viz. butadiene or isoprene, with a major proportion of isobutylene.

Polymers of conjugate-diolefin hydrocarbons, as above described and illustrated, lend themselves to sulfur-curing.

It will be noted that in Formula 1 the weight of the resinous components amounts to substantially 1½ times the weight of the rubber, i. e. 151.1 parts of resins to 100 parts of the rubber. Formula 2 likewise has substantially 1½ times as much resin as rubber, i. e. 145 parts of resins to 100 parts of rubber. Formula 3 has a resin to rubber ratio of 120:100, and Formula 4 a ratio of 140:100. The resin-to-rubber ratio of Formula 5 is 100:100. Thus the preferred resin-to-rubber ratio, as illustrated herein, is within the approximate range of 1:1 to 1.5:1.

In this specification and in the appended claims I employ the terms "sulfur-cure," "sulfur-cured" and the like, in respect to the treatment given to the rubbery polymers employed by me in making my adhesive cements, herein described. The sulfur-cure may be effected with any of a number of sulfur-bearing materials ordinarily used in rubber compounding as rubber vulcanizing agents. Hereinabove I have mentioned dipentamethylene thiuram tetrasulfide. Other analogous sulfur-curing agents are tetramethyl thiuram disulfide, tetraethyl thiuram disulfide, and selenium diethyl dithiocarbamate. It will be noted that the last-mentioned material contains selenium instead of sulfur, but it is so analogous to the sulfur-bearing materials that I am including it herein under the general designation, sulfur-curing agent. I have also mentioned herein the use of sulfur as such, plus a suitable accelerator, as illustrated. Other suitable accelerators include benzothiazyl disulfide, and "Acrin," a condensation product of hexamethylenetetramine, benzylchloride-mercaptobenzothiazole.

In order to produce an adhesive cement having a "sulfur-cured" rubbery polymer as herein contemplated, it is necessary for the particular rubbery polymer to be exposed to a time and temperature of reaction with such an amount of sulfur-curing agent that, were the rubbery polymery thus treated in the absence of admixed resin as herein called for, it would be insoluble and non-dispersible in a volatile organic solvent in which the uncured rubbery polymer is readily dispersible. Thus it will be seen that I contemplate a substantial extent of sulfur-curing, as distinguished from merely a minute amount. Again, in the absence of admixed resin, using the amount of sulfur-curing agent and the period of time and temperatures which I employ, the particular rubbery polymer would be rendered so unworkable that it could not be practically milled on a rubber mill, as can latex crepe, reclaimed rubber, Buna S and the like. If an attempt were made to work such product on a rubber mill, it would break up into shreds, instead of sheeting out and hanging together in the way which latex crepe, reclaimed rubber, and the like will do when subjected to milling.

Hereinabove I have described important unique and original features and aspects of my invention, and have set forth in detail several specific embodiments thereof. It will be understood that this is by way of illustration and not by way of limitation. My invention makes available important new results in the adhesive cement art, both in terms of the characteristics of the finished adhesive cemens and also in terms of the usefulness and usability in adhesive cement manufacture of Buna S, Buna N and various other rubbers. All embodiments within the scope hereof and of the copended claims are comprehended.

What I claim is:

1. Method of making a stable, sprayable viscous liquid adhesive cement composition comprising : (1) blending together 100 parts by weight of a vulcanizable gasoline-soluble conjugate-diolefin hydrocarbon rubbery polymer, 15–120 parts of a hydrocrabon-soluble tackifier resin compatible with said polymer, and an excess of a sulfur-curing agent over the amount normally required for sulfur-curing of said rubbery polymer, in the absence of said resin, to insolubility in gasoline, (2) heating the blend for a time and at a temperature sufficient, in the absence of said resin, to cause sulfur-curing of said rubbery polymer to insolubility in gasoline, and (3) dispersing the heated blend, together with additional hydrocarbon-soluble and polymer-compatible resin, in a volatile hydrocarbon solvent, the amount of said resin added to the blend subsequent to the sulfur-curing step being at least approximately as great as that added prior to said sulfur-curing step.

2. In the manufacture of a stably viscous, sprayable liquid adhesive cement composition characterized in that upon application as a bonding film or adhesive coating it at first becomes highly tacky and upon further evaporation of solvent it dries to a substantially non-tacky state and provides a film or bond of a tough, elastic, rubbery nature which maintains high bonding strength at elevated temperatures of the order of 160°–180° F., the method comprising; (1) blending together 100 parts by weight of a vulcanizable gasoline-soluble conjugate-diolefin hydrocarbon rubbery polymer, about 20–40 parts of hydrocarbon-soluble tackifier resin compatible with said polymer, and an excess of sulfur curing agent over the amount normally required for sulfur-curing of said rubbery polymer, in the absence of said resin, to insolubility in gasoline, (2) heating the blend for a time and at a temperature sufficient, in the absence of said resin, to cause sulfur-curing of said rubbery polymer to insolubility in gasoline, and (3) dispersing the heated blend, together with additional hydrocarbon-soluble and polymer-compatible resin to a total amount of not more than about 300 parts, in a volatile hydrocarbon solvent, the amount of said resin added to the blend subsequent to the sulfur-curing step being at least approximately as great as that added prior to said sulfur-curing step.

3. In the manufacture of a stably viscous, sprayable liquid adhesive cement composition characterized in that upon application as a bonding film or adhesive coating it at first becomes highly tacky and upon further evaporation of solvent it dries to a substantially non-tacky state and provides a film or bond of a tough, elastic, rubbery nature which maintains high bonding strength at elevated temperatures of the order of 160°–180° F., the method comprising: (1) blending together 100 parts by weight of a vulcanizable gasoline-soluble conjugate-diolefin hydrocarbon rubbery polymer consisting mainly of butadiene-styrene synthetic rubber, about 40 parts of hydrocarbon-soluble tackifier resin compatible with said polymer, and an excess of sulfur-curing agent over the amount normally required, in the absence of said resin, for sulfur-curing of said rubbery polymer to insolubility in gasoline, (2) heating the blend for a time and at a temperature sufficient, in the absence of said resin, to cause sulfur-curing of said rubbery polymer to insolubility in gasoline, and (3) dispersing the heated blend, together with at least about 100 parts additional hydrocarbon-soluble and polymer-compatible tackifying resin, in a volatile hydrocarbon solvent.

4. A viscous liquid solvent-type adhesive cement composition, stably uniform under normal conditions of storage and shipping, produced in accordance with claim 1, said composition being further characterized in that, upon application to a surface as a thin coating and evaporation of solvent, it passes through a highly tacky state and dries to a tack-free state, the dried film being tough, rubbery and elastic, and maintaining a high bonding strength and internal strength at elevated temperatures of the order of 160°–180° F.

5. A viscous liquid solvent-type adhesive cement composition, stably uniform under normal conditions of storage and shipping, produced in accordance with claim 2, said composition being further characterized in that, upon application to a surface as a thin coating and evaporation of solvent, it passes through a highly tacky state and dries to a tack-free state, the dried film being tough, rubbery and elastic, and maintaining a high bonding strength and internal strength at elevated temperatures of the order of 160°–180° F.

6. A viscous liquid solvent-type adhesive cement composition, stably uniform under normal conditions of storage and shipping, produced in accordance with claim 3, said composition being made from a rubbery polymer composed mainly of a rubbery butadiene-styrene copolymer, sulfur-cured in the presence of a minor proportion of the total resin content of the composition, said composition being further characterized in that, upon application to a surface as a thin coating and evaporation of solvent, it passes through a highly tacky state and dries to a tack-free state, the dried film being tough, rubbery and elastic, and maintaining a high bonding strength and internal strength at elevated temperatures of the order of 160°–180° F.

7. In the manufacture of a stably viscous, sprayable liquid adhesive cement composition characterized in that upon application as a bonding film or adhesive coating it at first becomes highly tacky and upon further evaporation of the solvent it dries to a substantially non-tacky state and provides a film or bond of a tough, elastic, rubbery nature which maintains high bonding strength at elevated temperatures of the order of 160°–180° F., a method comprising: (1) blending together 100 parts by weight of a vulcanizable gasoline-soluble conjugate-diolefin hydrocarbon rubbery polymer, at least about 40 parts of hydrocarbon-soluble tackifier resin compatible with said polymer, and an excess of sulfur-curing agent over the amount normally required for sulfur-curing of said rubbery polymer in the absence of said resin to insolubility in gasoline, (2) heating the blend for a time and at a temperature sufficient, in the absence of said resin, to cause sulfur-curing of said rubbery polymer to insolubility in gasoline, and (3) dispersing the heated blend, together with additional hydrocarbon-soluble and polymer-compatible resin to a total amount of at least about 120 parts, in a volatile hydrocarbon solvent.

HARRY J. HOFFMAN.

REFERENCES CITED

The following references are of record in the file of this patent:

UNITED STATES PATENTS

| Number | Name | Date |
|---|---|---|
| 1,892,167 | Semon | Dec. 27, 1932 |
| 2,080,730 | McCortney | May 18, 1937 |
| 2,177,627 | Drew | Oct. 31, 1939 |
| 2,304,071 | Bollinger | Dec. 8, 1942 |
| 2,347,211 | Merrill et al. | Apr. 25, 1944 |
| 2,352,460 | Treves | June 27, 1944 |
| 2,416,926 | Kemp | Mar. 4, 1947 |
| 2,459,891 | Nelson et al. | Jan. 25, 1949 |